Feb. 21, 1933.   C. S. FRANKLIN ET AL   1,898,827
ALTERNATING CURRENT GENERATOR
Filed Jan. 28, 1931
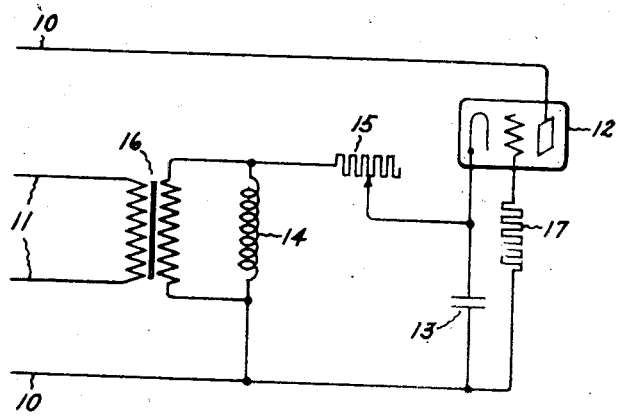
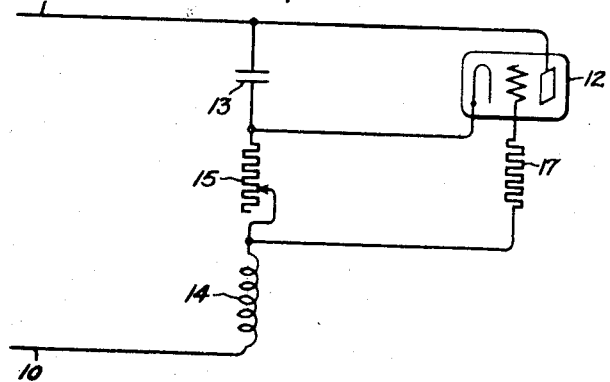
Inventors:
Charles S. Franklin,
Denzil A. Cutler,
by Charles E. Mullan
Their Attorney.

Patented Feb. 21, 1933

1,898,827

UNITED STATES PATENT OFFICE

CHARLES S. FRANKLIN, OF LOS ANGELES, AND DENZIL A. CUTLER, OF HOLLYWOOD, CALIFORNIA, ASSIGNORS TO GENERAL ELECTRIC COMPANY, A CORPORATION OF NEW YORK

ALTERNATING CURRENT GENERATOR

Application filed January 28, 1931. Serial No. 511,810.

Our invention relates to electric circuits for generating periodic currents and more particularly to such circuits utilizing electric valves for generating periodic currents variable in frequency within wide limits.

Heretofore numerous arrangements have been devised for generating periodic currents by means of electric circuits including electric valves. Certain of these arrangements utilizing electric valves of the pure electron discharge type have the disadvantage that only limited power output may be obtained at ordinary operating voltages. Other arrangements utilizing vapor electric valves have the disadvantage of unsatisfactory operation over wide variations in the frequency of the periodic current output. Our invention relates to arrangements of the type which forms the subject matter of the copending application of A. S. FitzGerald and H. L. Palmer, Serial No. 193,428, filed May 23, 1927, and assigned to the same assignee as the present application, which discloses and broadly claims certain features disclosed in the present application.

It is an object of our invention to provide an improved electric circuit including electric valves which will overcome the above mentioned disadvantages of the arrangements of the prior art and which will be simple and reliable in operation.

It is a further object of our invention to provide an improved electric circuit including electric valves for generating a periodic current which will operate satisfactorily over wide limits of frequency variation.

In accordance with our invention we provide a capacitor having a charging circuit and a discharging circuit. An electric valve provided with a control element is included in one of these circuits while the other includes an impedance having a variable resistance component. A grid circuit is provided for the electric valve, responsive to the charge on the capacitor, so that the valve may be rendered conducting to transfer current from one circuit to the other when the capacitor has reached a predetermined potential. The load circuit may be connected across the capacitor or across some portion of the charging or discharging circuit. The frequency of the periodic current generated by the circuit can be easily controlled over wide limits by proper variation of the resistance of the circuit.

For a better understanding of our invention together with other and further objects thereof, reference is had to the accompanying drawing and its scope will be pointed out in the appended claims. Fig. 1 of the accompanying drawing is a diagrammatic representation of one embodiment of our invention and Fig. 2 shows a modification thereof.

Referring to Fig. 1 of the drawing, we have illustrated an arrangement for receiving direct current or alternating current from the circuit 10, converting it into periodic current of variable frequency and transmitting it to the receiving circuit 11. This apparatus comprises a capacitor 13, a circuit for charging the capacitor from the direct current circuit 10 including an electric valve 12, and a non-emissive conductive path including a reactor 14 and a resistor 15 for discharging the capacitor 13. By the term "non-emissive conductive path" reference is made to a circuit in which current may traverse the complete circuit by the ordinary phenomenon of conduction as distinguished from conduction through an electric valve, which includes electronic emission from an electrode to a gaseous space or vacuum. The electric valve 12 is provided with an anode, a cathode and a control grid and may be of any of the several types well known in the art though I prefer to use a vapor electric discharge valve. The grid of the valve 12 is connected through the current limiting resistor 17 to that side of the source 10 which is connected to the capacitor 13. The receiving circuit 11 may be connected across any of the several circuit elements but we prefer to connect it across the reactor 14 through a transformer 16.

In explaining the operation of our invention, it will be assumed that the circuit 10 is energized with direct current. Before current begins to flow it is seen that the grid of the valve 12 is connected to its cathode through the reactor 14 and resistor 15 so that these two electrodes will be at the same potential. The electric valve 12 preferably has such a characteristic that current will flow between its anode and cathode with a positive anode potential when its grid and cathode are of the same potential, or, as is well understood by those skilled in the art, in the case of an electric valve with a grid characteristic other than zero, a small bias battery may be included in the grid circuit so as to render the valve conducting whenever its grid and cathode would otherwise be at the same potential. Current will now flow from the source 10 through the valve 12 and rapidly charge the capacitor 13, the magnitude of this current being limited only by the capacity of the source and the resistance of the valve 12 and the capacitor 13. As the capacitor 13 becomes charged to the potential of the source 10, the charging current is reduced to practically zero. At the same time a small current will flow through the valve 12 into the circuit comprising the resistor 15 and reactor 14, but the impedance of this circuit is so proportioned that the current in it will not reach any considerable magnitude in the time required to charge the capacitor 13. At the same time substantially the full potential of the source 10 appears across the capacitor 13 with the result that a high negative potential appears upon the grid of the valve 12. As is well understood by those skilled in the art, a definite potential is required to maintain an arc discharge in a vapor electric valve which, obviously, is substantially equal to the impedance drop in the valve. It is also well known that for very small current values, the internal resistance of a vapor electric valve increases substantially. The result is that when current in a vapor electric valve drops below a predetermined value the arc is automatically extinguished and the valve becomes nonconducting; this minimum value of current required to maintain an arc is hereinafter referred to as the critical current value of the valve. It is also well known that while the grid of a vapor electric valve has no control over the magnitude of current flowing in the valve when the discharge has once started, when the current in the valve becomes very small it may be interrupted by impressing a very large negative potential upon the grid of the valve. In the arrangement just described these two effects combine to interrupt the current in the valve 12 when the capacitor 13 becomes substantially completely charged. When the valve 12 becomes nonconducting, the capacitor 13 begins to discharge through the resistor 15 and reactor 14. The time required for this discharge depends upon the relative values of the circuit elements increasing with an increase in impedance of any of the circuit elements. When the capacitor 13 becomes substantially completely discharged the potential of the grid of the valve 12 again approaches the cathode potential, the valve 12 is rendered conducting and the above described cycle is repeated. Pulsating unidirectional potential appears at the terminals of the reactor 14 and is impressed upon the primary winding of the transformer 16 and thus produces an alternating potential in the receiving circuit 11.

While we have shown the discharge circuit of the capacitor 13 as made up of the reactor 14 and resistor 15, it will be obvious that the reactor 14 may be omitted if desired. In such a case it is only necessary that the resistance of the element 15 is sufficient to draw a current through the valve 12 from the source 10 which is less than the critical value of the valve 12. With either arrangement, however, the time required to discharge the capacitor 13 and hence the frequency of the periodic current output is determined primarily by the value of the resistor 15. When the resistor 15 has its minimum setting, its resistance should be sufficient in combination with the impedance of the reactor 14 to limit the current drawn through the valve 12 to less than the critical value of the valve at the end of the period required to charge the capacitor 13.

While the above described apparatus is particularly suited for operation from a direct current circuit it may be, of desired, operated from an alternating current circuit.

Fig. 2 represents a modification of our invention comprising a rearrangement of the circuit elements of Fig. 1. In this arrangement the charging circuit of the capacitor 13 includes the reactor 14 and resistor 15 while the capacitor 13 is discharged directly through the electric valve 12. The control grid of the electric valve 12 is connected through the current limiting resistor 17 to the junction between the reactor 14 and resistor 15. The operation of this arrangement is substantially the same as that described above except that the charging and discharging cycles are reversed, that is, the capacitor 13 is slowly charged from the source 10 through the reactor 14 and resistor 15 until it reaches a predetermined potential. At this point the potential across the resistor 15 which is applied between the control grid and the cathode of electric valve 12 has decreased to a sufficient value to render the valve 12 conducting and the capacitor 13 rapidly discharges through the valve 12. When the capacitor 13 has become substantially completely discharged, the current through the valve 12 is automatically interrupted as explained above and this cycle is repeated indefinitely. As in the arrangement of Fig. 1, the reactor 14 may be omitted in case the resistance of the element 15 is sufficient to maintain the charging current of capacitor 13 below the critical value of the valve 12.

While we have described what we at present consider the preferred embodiment of our invention, it will be obvious to those skilled in the art that various changes and modifications may be made without departing from our invention and we therefore aim in the appended claims to cover all such changes and modifications as fall within the true spirit and scope of our invention.

What we claim as new and desire to secure by Letters Patent of the United States, is:

1. Apparatus for generating a periodic current of variable frequency comprising a source of current, a capacitor, a circuit for charging said capacitor from said source, a circuit for discharging said capacitor, a vapor electric valve connected in only one of said circuits and an impedance including a resistance component variable within predetermined limits, connected in the other circuit, said impedance having such a value that the current drawn from said source by said impedance at the end of a period required for a substantially complete change in the charge of said capacitor has a value less than the critical value of the valve current irrespective of variations in said resistance.

2. Apparatus for generating a periodic current comprising a source of direct current, a capacitor, a circuit for charging said capacitor from said source, a circuit for discharging said capacitor, a vapor electric valve in said charging circuit and an impedance in said discharging circuit of such a value as to draw a current from said source less than the critical value of the valve current at the time when said capacitor becomes substantially completely charged.

3. Apparatus for generating a periodic current comprising a source of direct current, a capacitor, a circuit for charging said capacitor, a circuit for discharging said capacitor, a vapor electric valve included in said charging circuit and an impedance in said discharging circuit, including an inductance of such a value that the current drawn from said source by said inductance at the end of a period required for substantially completely charging said capacitor has a value less than that required to maintain a discharge in said valve.

4. Apparatus for generating a periodic current comprising a source of direct current, a capacitor, a circuit for charging said capacitor from said source, a circuit for discharging said capacitor, a vapor electric valve included in said charging circuit and a resistance in said discharging circuit of such a value that the current drawn from said source by said resistance is less than that required to maintain a discharge in said valve.

5. Apparatus for generating a periodic current of variable frequency comprising a source of current, a capacitor and a vapor electric valve, serially connected across said source, said valve being provided with a control grid, an inductance and a resistance variable within predetermined limits connected in parallel to said capacitor, said inductance and resistance being so proportioned relative to said capacitor that current through them will not rise to a value sufficient to maintain a discharge in said valve within the time required to substantially completely charge said capacitor irrespective of variations of said resistance, and a connection between said grid and the terminal of said source connected to said capacitor.

6. Apparatus for generating a periodic current comprising a source of current, a capacitor, a discharging circuit for said capacitor including a vapor electric valve and a circuit for charging said capacitor from said source including a resistance of such a value as to draw a current from said source less than the critical value of the valve current.

7. Apparatus for generating a periodic current of variable frequency comprising a source of current, a circuit including a serially connected capacitor, inductance and a resistance variable within predetermined limits connected across said source, a vapor electric valve provided with an anode, a cathode, and a control grid connected in parallel to said capacitor, said inductance and resistance being so proportioned relative to said capacitor that current through them will not rise to a value sufficient to maintain a discharge in said valve within the time required substantially completely to charge said capacitor irrespective of variations of said resistance, and a connection between said grid and a point in said charging circuit which is negative with respect to said cathode when current flows in said charging circuit.

8. Apparatus for generating a periodic current comprising a source of direct current, a capacitor, a circuit for charging said capacitor from said source, a circuit for discharging said capacitor, a vapor electric valve included in only one of said circuits and an impedance in the other of said circuits of such a value as to limit the current therethrough to a value less than the critical value of said valve during the interval in which the valve is conductive.

In witness whereof the said CHARLES S. FRANKLIN has set his hand this 23rd day of January, 1931, and the said DENZIL A. CUTLER has set his hand this 23rd day of January, 1931.

CHARLES S. FRANKLIN.
DENZIL A. CUTLER.